(12) United States Patent
Alamartimo et al.

(10) Patent No.: US 10,715,978 B2
(45) Date of Patent: Jul. 14, 2020

(54) USE OF ESIM PROFILES

(71) Applicant: UROS TECHNOLOGY S.À R.L., Ettelbruck (LU)

(72) Inventors: Mika Alamartimo, Oulu (FI); Santtu Harvio, Oulu (FI); Ilkka Rahikainen, Oulu (FI)

(73) Assignee: UROS TECHNOLOGY S.À R.L., Ettelbruck (LU)

( * ) Notice: Subject to any disclaimer, the term of this patent is extended or adjusted under 35 U.S.C. 154(b) by 0 days.

(21) Appl. No.: 16/445,817

(22) Filed: Jun. 19, 2019

(65) Prior Publication Data

US 2019/0387380 A1 Dec. 19, 2019

(30) Foreign Application Priority Data

Jun. 19, 2018 (FI) ..................................... 20185548

(51) Int. Cl.
| | |
|---|---|
| H04W 4/24 | (2018.01) |
| H04W 4/50 | (2018.01) |
| H04W 12/00 | (2009.01) |
| H04M 1/725 | (2006.01) |
| H04M 17/00 | (2006.01) |
| H04W 88/02 | (2009.01) |

(52) U.S. Cl.
CPC ......... *H04W 4/50* (2018.02); *H04M 1/72525* (2013.01); *H04M 17/103* (2013.01); *H04W 4/24* (2013.01); *H04W 12/0013* (2019.01); *H04W 88/02* (2013.01)

(58) Field of Classification Search
CPC ..... H04W 4/50; H04W 4/24; H04W 12/0013; H04M 17/103

USPC .............................. 455/419, 550.1, 551, 558
See application file for complete search history.

(56) References Cited

U.S. PATENT DOCUMENTS 9,615,250 B2 * 4/2017 Bruner .................... H04W 8/18
2010/0311404 A1 12/2010 Shi et al.
(Continued)

FOREIGN PATENT DOCUMENTS

| CN | 107959951 A | 4/2018 |
|---|---|---|
| EP | 2975872 A1 | 1/2016 |

(Continued)

OTHER PUBLICATIONS

Jan. 7, 2019 Search Report issued in Finnish Patent Application No. 20185548.
(Continued)

*Primary Examiner* — Congvan Tran
(74) *Attorney, Agent, or Firm* — Oliff PLC

(57) ABSTRACT

Use of embedded subscriber identity modules, eSIM, profiles: compiling a list of geographical locations for a predetermined period in future, and communicating wirelessly the list and the predetermined period to a service provider before the predetermined period; detecting a home wireless network, and downloading wirelessly a set of eSIM profiles into one or more eSIM chips of a mobile from the service provider before the predetermined period; using the set of the eSIM profiles for wireless service in one or more geographical locations of the list during the predetermined period; and detecting the home wireless network after the predetermined period, and removing the set of the eSIM profiles from the one or more eSIM chips.

15 Claims, 2 Drawing Sheets

(56) References Cited

U.S. PATENT DOCUMENTS

| | | | | |
|---|---|---|---|---|
| 2011/0268022 A1* | 11/2011 | Xu | ................... | H04Q 3/0025 |
| | | | | 370/328 |
| 2013/0316676 A1* | 11/2013 | Nousiainen | ............ | H04W 8/18 |
| | | | | 455/411 |
| 2013/0324079 A1* | 12/2013 | Korkiakoski | ........ | H04M 15/70 |
| | | | | 455/406 |
| 2015/0170114 A1* | 6/2015 | Klingen | ................ | G06Q 20/36 |
| | | | | 705/44 |
| 2015/0271662 A1* | 9/2015 | Lhamon | ............... | H04W 8/183 |
| | | | | 370/329 |
| 2017/0134298 A1 | 5/2017 | Walke | | |
| 2017/0339617 A1 | 11/2017 | Lei et al. | | |
| 2017/0347259 A1 | 11/2017 | Kwak et al. | | |
| 2018/0020342 A1* | 1/2018 | Park | ................... | H04L 63/0853 |
| 2018/0152872 A1* | 5/2018 | Wirtanen | ............. | H04W 48/16 |
| 2018/0212946 A1* | 7/2018 | Nix | ..................... | H04L 9/0869 |

FOREIGN PATENT DOCUMENTS

| | | |
|---|---|---|
| EP | 3429234 A1 | 1/2019 |
| WO | 2012/058446 A1 | 5/2012 |
| WO | 2017/185255 A1 | 11/2017 |

OTHER PUBLICATIONS

Jul. 16, 2019 Search Report issued in European Patent Application No. 19179380.

GSMA. "eSIM Whitepaper The what and how of Remote SIM Provisioning". Mar. 2018.

* cited by examiner

USE OF ESIM PROFILES

FIELD

The invention relates to a mobile subscriber apparatus, which uses embedded subscriber identity modules, eSIM, profiles, and to computer program code for the mobile subscriber apparatus.

BACKGROUND eSIM is a global specification by the GSMA which enables remote SIM provisioning (over the air, OTA, provisioning) of a mobile device. Multiple eSIM profiles can be loaded to the eSIM chip of the user. Any loaded profile will cause costs to the service provider (prepaid or normal eSIM). Profile loading is critical and needs a reliable connection to be successful. Currently, the profiles are often loaded just when arriving to the target country or new area. The wireless network is not of high quality in the change area: the border area of different countries, or on an airport when a plane has just landed, or in an airport terminal where the network is very busy and reserved.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Figure 1:
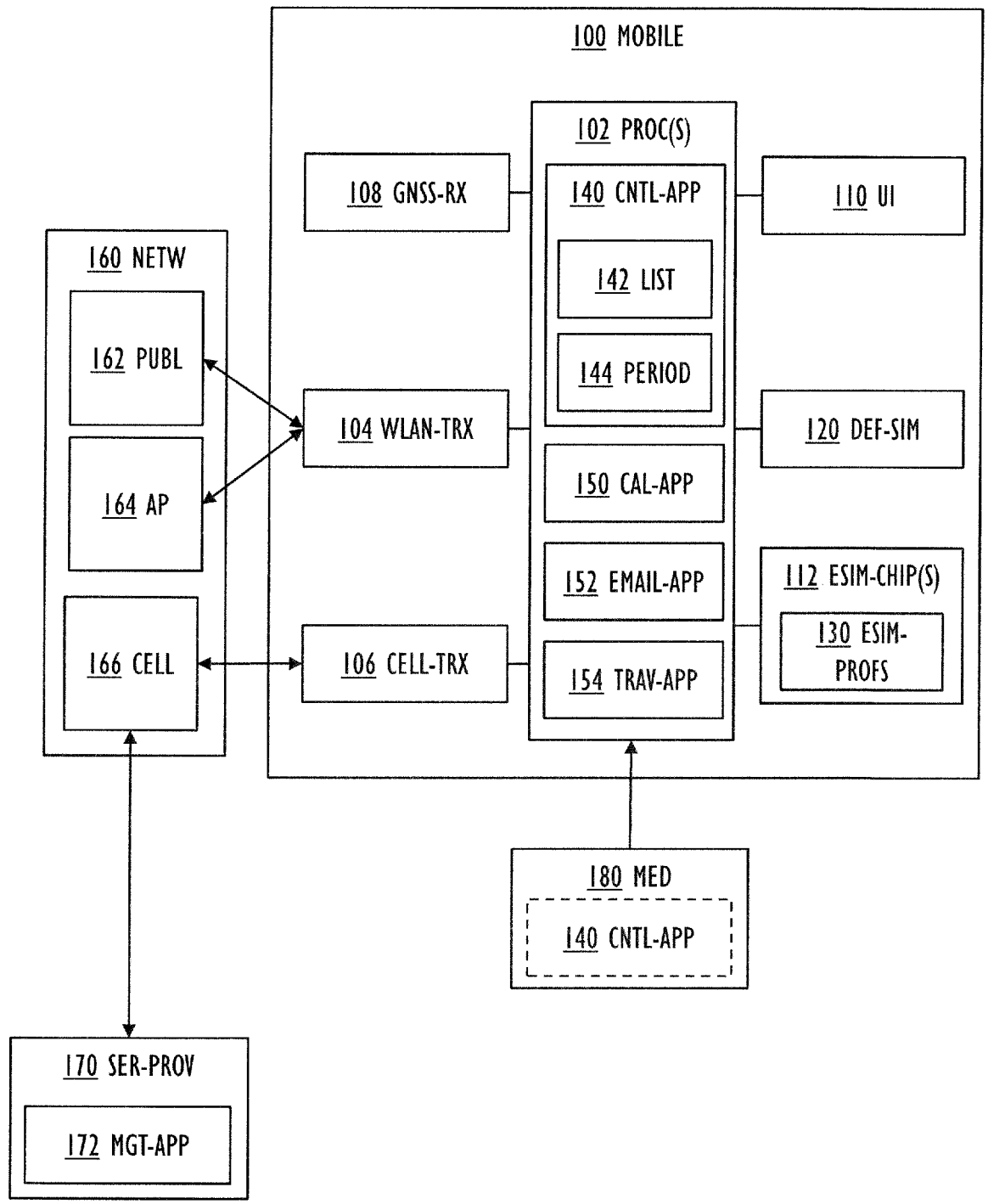
Figure 2:
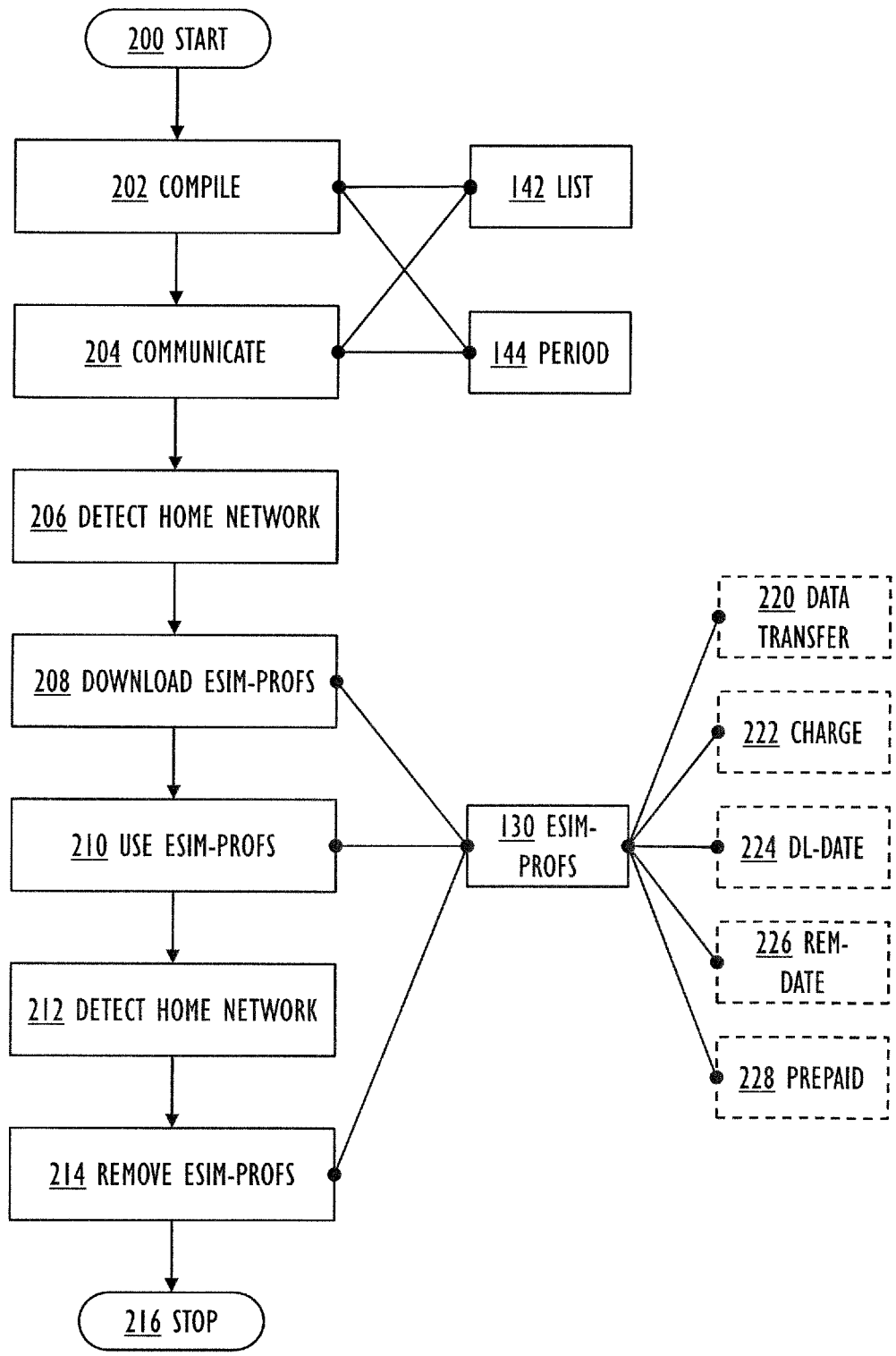

Some example embodiments will now be described with reference to the accompanying drawings, in which FIG. 1 illustrates example embodiments of a mobile subscriber apparatus; and FIG. 2 illustrates example embodiments of a method for using eSIM profiles in the mobile subscriber apparatus.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

Let us study simultaneously both FIG. 1, which illustrates example embodiments of a mobile subscriber apparatus 100, and FIG. 2, which illustrates example embodiments of a method for using eSIM profiles 130 in the mobile subscriber apparatus 100.

The mobile subscriber apparatus 100, or mobile 100 for short, may be any mobile user apparatus, which requires the use of the eSIM profiles 130 for obtaining wireless service from the networks, including, but not limited to the following: a mobile phone, a smart phone, a smartwatch, or any other type of a portable ICT (Information and communication technology) user apparatus (such as a portable computer, a tablet computer, a connected Internet of Things (IoT) device, etc.).

The mobile 100 comprises one or more radio transceivers 104, 106, and one or more eSIM chips 112 capable of storing eSIM profiles 130.

The mobile 100 may comprise a cellular radio transceiver 106 configured to communicate with a cellular radio network such as a mobile phone system. Additionally, or alternatively, the mobile 100 may comprise a WLAN radio transceiver 104 configured to communicate with a wireless local area network, WLAN. The wireless communication is therefore implemented with a suitable cellular communication technology such as GSM, GPRS, EGPRS, WCDMA, UMTS, 3GPP, IMT, LTE, LTE-A, 3G, 4G, 5G etc. and/or with a suitable non-cellular communication technology such as Bluetooth, Bluetooth Low Energy, Wi-Fi, WLAN, Zigbee, etc.

The one or more eSIM chips 112 are either soldered as a secure data storage in a circuit board of the mobile 100 or as a part of a silicon (=an integrated circuit) of the mobile 100. This means that the eSIM chips 112 are in principle non-replaceable. However, as the eSIM technology is still evolving, the eSIM chips 112 may in some future use cases be less embedded, meaning that the eSIM chips 112 are embedded in the mobile 100 removably.

The mobile 100 also comprises one or more processing units 102, coupled with the one or more radio transceivers 104, 106 and the one or more eSIM chips 112.

The processing unit 102 may be implemented with one or more processors (such as a microprocessor) and software, and/or as an application-specific integrated circuit (ASIC), or as any other way of implementing a device that is capable of processing data.

The processing unit 102 is configured to cause the execution of the method of FIG. 2.

A computer-readable medium 180 comprises computer program code 182, which, when loaded into the one or more processing units 102 and executed by the one or more processing units 102, causes the execution of the method.

The computer-readable medium 180 may comprise at least the following: any entity or device capable of carrying the computer program code to the mobile 100, a record medium, a computer memory, a read-only memory, an electrical carrier signal, a telecommunications signal, and a software distribution medium. In some jurisdictions, depending on the legislation and the patent practice, the computer-readable medium 180 may not be the telecommunications signal. The computer-readable medium 180 may be a computer-readable storage medium, or a non-transitory computer-readable storage medium.

The method of FIG. 2 starts in 200.

In 202, a list 142 of geographical locations is compiled for a predetermined period 144 in future.

FIG. 1 illustrates four different example embodiments of obtaining the list 142. One or more (in any combination) of these different ways may be applied for obtaining the list 142.

In an example embodiment, a user interface 110 is communicatively coupled with the one or more processing units 102. The mobile 100 may comprise the user interface 110, or the user interface 110 may be a part of a remote apparatus communicatively coupled with the mobile 100. The one or more processing 102 units are configured to cause: obtaining the list 142 and/or the predetermined period 144 from the user of the mobile 100 with the user interface 110. The user interface 110 implements the user interaction and may comprise various elements: a touch screen, a display, a keyboard, a keypad, a speech-recognition system, etc. The user may select areas or countries for the list 142 by clicking a map shown in the user interface 110 for the next trip. The user may select or input the time periods related to areas/countries of the list 142 by the user interface 110 for the predetermined period 144.

In an example embodiment, the mobile 100 comprises an electronic calendar application 150 of the user of the mobile 100 coupled with the one or more processing units 102. The one or more processing units 102 are configured to cause: obtaining the list 142 and/or the predetermined period 144 from the electronic calendar application 150.

In an example embodiment, the mobile 100 comprises an electronic mail application 152 of the user of the mobile 100 coupled with the one or more processing units 102. The one or more processing units 102 are configured to cause: obtaining the list 142 and/or the predetermined period 144 from the electronic mail application 152.

In an example embodiment, the mobile 100 comprises an electronic travel booking application 154 of the user of the mobile 100 coupled with the one or more processing units 102. The one or more processing units 102 are configured to cause: obtaining the list 142 and/or the predetermined period 144 from the electronic travel booking application 154.

In 204, the list 142 and the predetermined period 144 is communicated wirelessly to a service provider 170 before the predetermined period 144.

In 206, a home wireless network 160 is detected.

In an example embodiment, the home wireless 160 network is secure and reliable. Traffic in the home wireless network 160 may be encrypted to be secure, for example. The traffic in the home wireless network 160 may be of sufficient speed and of sufficient signal strength to be reliable, for example. There are many ways to test the reliability and speed. For example: www.speedtest.net and www.speedtest.att.com. The test may report the connection quality, download and upload speed for data. The sufficient speed may be for example 10-50 Mbit/s for download, and 2-20 Mbit/s for upload. The sufficient signal strength may be −60 dBm--−85 dBm, for example.

FIG. 1 illustrates three different example embodiments of the home wireless network 160, of which one or more may apply, depending also whether the mobile 100 comprises the cellular radio transceiver 106 and/or the WLAN radio transceiver 104.

In an example embodiment, the home wireless network 160 comprises a wireless access point 164 in a home or a workplace of a user of the mobile 100.

In an example embodiment, the home wireless network 170 comprises a cellular radio system 166 accessed with a subscriber identity module 120 (such as a default SIM or an eSIM profile 120 stored in the eSIM chip 112) installed in the mobile 100.

In an example embodiment, the home wireless network 160 comprises a public wireless network 162 accessible in a permanent residence (such as home town or home country) of the user of the mobile 100. The public wireless network 162 may be located in a railway station, airport, harbour area or other such public place in the residence of the user.

In 208, a set of eSIM profiles 130 is downloaded wirelessly into the one or more eSIM chips 112 from the service provider 170 before the predetermined period 144.

In 210, the set of the eSIM profiles 130 is used for wireless service in one or more geographical locations of the list 142 during the predetermined period 144. In an example embodiment, the set of the eSIM profiles 130 enables only data transfer 220 as the wireless service. As shown in FIG. 1, the mobile 100 may be provided with a default SIM or an eSIM profile 120 stored in the eSIM chip 112, which provides voice calls and text messaging both home and away, and possibly also data transfer at home. During roaming (from the point of view of the default SIM or eSIM profile 120), the set of the eSIM profiles 130 may thus provide the wireless data transfer service.

In 212, the home wireless network 160 is detected after the predetermined period. In 214, the set of the eSIM profiles 130 is removed from the one or more eSIM chips 112.

Note that a location of the mobile 100 may be determined during the operation sequence 202-204-206-208-210-212-214 so that the various operations take place in an orderly and a planned manner. The location determination may be made with a global navigation satellite system (GNSS) receiver 108 of the mobile, such as a GPS (Global Positioning System) receiver 108. Other location methods may also be used, such as a radio network positioning (based on the triangulation method or cell camping, for example). If the location determination detects deviations as compared to the list 142, the list 142 may be dynamically adapted, whereby also the set of the eSIM profiles 130 may be updated by importing further eSIM profiles, for example.

The method ends in 216 after the processing is finished.

As an example of the above sequence, consider the following use case 1. A user is planning his business trip from Helsinki to Germany, Belgium and France. He has booked flight and train tickets on-line and received the tickets into his email 152. The flights have been linked and saved to his Google calendar 150 automatically. The train tickets are in his email 152, but not linked to his calendar 150. The trip from Belgium to France is planned to be done by a car. The schedule looks like this:

Helsinki-Frankfurt, Finnair AY111, 2016-02-01 7:40-9:20 am (information in email 152 and calendar 150);
Frankfurt-Strasbourg; train 2016-02-03 6:58-8:50 am (email);
Strasbourg—Paris, car 2016-02-05 about 14:00-19:00 (calendar: meeting in Paris 2016-02-06 9-11 am (local time));
Paris-Helsinki, Finnair AY 222, 2016-02-08 15:10-19:00 (email, calendar).

As the business trip is approaching, an application 140 in the mobile 100 collects information about the data related to the trip; it finds the schedule as listed above.

The application 140 analyzes from the data that the user will travel as follows:

Helsinki from present to 2016-02-01 7:40 (departure time due to a flight);
Frankfurt from 2016-02-01 9:20 am to 2016-02-03 8:00 (estimated time between Frankfurt-Strasbourg due to a train);
Strasbourg 2016-02-03 8:00 am to (NOT KNOWN);
Paris (NOT KNOWN)—2016-02-06 9-11 am (meeting scheduled) to 2016-02-08 15:10 (departure time due to a flight);
Helsinki 2016-02-08 19:00–→.

The application 140 will show the plan to the user and ask for input.

The user updated that he is leaving from the Strasbourg 2016-02-05 about 2 pm by a car and arriving to Paris at 19:00.

The application 140 updates the trip plan as follows:
Helsinki from present to 2016-02-01 7:40 (departure time due to a flight);
Frankfurt from 2016-02-01 9:20 am to 2016-02-03 8:00 (estimated time between Frankfurt-Strasbourg due to a train);
Strasbourg 2016-02-03 8:00 am to 2016-02-05 03:00 (estimated due to a car);
Paris 2016-02-05 03:00 to 2016-02-08 15:10 (departure time due to a flight);
Helsinki 2016-02-08 19:00→.

The application 140 now prepares eSIM profiles according to the plan and schedules:
Helsinki (home network), Frankfurt (profile F), Strasbourg (profile S), Paris (profile P), Helsinki (back to home network).

When the trip starts, the application 140 follows the user's location and time: 2016-02-01 about 7:00 the application 140 checks that the user is in the Helsinki airport as scheduled.

The application 140 prepares to load the eSIM profile applicable in Frankfurt (profile F) and loads its before the flight is departing.

The application 140 may check flight schedules for ensuring delays, cancellations or other changes.

When the user arrives to Frankfurt and connects to the network, the eSIM profile is ready to be used.

2016-02-03 06:30 the application 140 checks if the user is in the railway station. If so, the application 140 loads the eSIM profile S applicable in Strasbourg to the eSIM.

2016-02-05 14:00 the application 140 checks if the user is in a car. If so, the application 140 loads the eSIM profile P applicable in Paris to the eSIM.

2016-02-08 14:30 the application 140 checks if the user is in the Paris airport. If so, the application 140 rechecks that the home SIM or eSIM profile is ready to be used in Helsinki again.

2016-02-08 19:00 the application 140 checks if the user has returned to Helsinki and is connected to the home network. If so, the application 140 may remove profiles F, S and P from the eSIM. The trip is done, the application 140 may report the usage and invoice accordingly.

In an alternative use case 2, the user plans the same trip as in use case 1. The application 140 will get the data of places and schedules as follows.

The application 140 analyzes the data and detects that the user will be located as follows:
Helsinki from present to 2016-02-01 7:40 (departure time due to a flight);
Frankfurt from 2016-02-01 9:20 am to 2016-02-03 8:00 (estimated time between Frankfurt-Strasbourg due to a train);
Strasbourg 2016-02-03 8:00 am to (NOT KNOWN);
Paris (NOT KNOWN)—2016-02-06 9-11 am (meeting scheduled) to 2016-02-08 15:10 (departure time due to a flight);
Helsinki 2016-02-08 19:00→.

The application 140 now prepares eSIM profiles according to the plan and schedules: Helsinki (home network), Frankfurt (profile F), Strasbourg (profile S), Paris (profile P), Helsinki (back to home network).

The application 140 detects that profiles F, S and P are needed during the trip starting 2016-02-01 and ending 2016-02-08.

The application 140 will check when the user is at home or in the office for example two days before the trip (2016-01-30-2016-01-31). When the user is at home or at office and the network is ok, the profiles are loaded to the eSIM. The application 140 detects when the user returns to the home network. When the user is back, and the home network is ok and in use, the application 140 will remove the profiles F, S and P from the eSIM.

Let us study some further example embodiments enhancing the above-described basic example embodiments.

In an example embodiment, the one or more processing units 102 are configured to cause: receive a charge 222 for the use 210 of the set of the eSIM profiles 130 while downloading the set of the eSIM profiles 130. In this way, the user of the mobile 100 may obtain information with the user interface 110 of the mobile 100 about the costs of using 210 the set of the eSIM profiles 130.

In an example embodiment, the one or more processing units 102 are configured to cause: record a download date 224 of downloading 208 the set of the eSIM profiles 130 and a removal date 226 of removing 214 the set of the eSIM profiles 130 and, after detecting 212 the home wireless network 160 after the predetermined period 144, reporting wirelessly the download date 224 and the removal date 226 to the service provider 170 using the home wireless network 160. In this way, the use of the set of the eSIM profiles 130 may be controlled in a precise fashion. The eSIM profiles belonging to the set of the eSIM profiles 130 may, for example, be used by another user before and after the period determined by the download date 224 and the removal date 226.

In an example embodiment, the set of the eSIM profiles 130 comprises prepaid eSIM profiles 228 owned by the service provider 170. The one or more processing units 102 may be configured to cause: receive a right to use 210 the set of the prepaid eSIM profiles 130, 228 while downloading the set of the eSIM profiles 130 for the predetermined period 144 or between the downloading 208 and the removing 214.

The service provider 170 may be an operator-independent supplier of the eSIM profiles 130, i.e., the service provider 170 may obtain the eSIM profiles 130 from a plurality of competing network operators and thereby cover a specific geographic area (a country, a continent, or even the whole globe, for example). As shown in FIG. 1, the mobile 100 may be provided with a control application 140, which communicates with a management application 172 of the service provider 170 to implement the described example embodiments enabling the flexible, secure and user-friendly use of the eSIM profiles 130 by a plurality of various users in a serial way.

It will be obvious to a person skilled in the art that, as technology advances, the inventive concept can be implemented in various ways. The invention and its embodiments are not limited to the example embodiments described above but may vary within the scope of the claims.

The invention claimed is:

1. A mobile subscriber apparatus for use with a home wireless network that is secure and reliable, the mobile subscriber apparatus comprising:
   one or more radio transceivers;
   one or more embedded subscriber identity module (eSIM) chips configured to store eSIM profiles; and
   at least one processor and/or circuit, coupled with the one or more radio transceivers and the one or more eSIM chips, the at least one processor and/or circuit being configured to:
      compile a list of geographical locations for a predetermined period that is set in future, and wirelessly communicate the list and the predetermined period to a service provider before the predetermined period begins;

detect the home wireless network;

wirelessly download a set of eSIM profiles into the one or more eSIM chips from the service provider before the predetermined period begins;

recording a download date of downloading the set of the eSIM profiles;

use the set of the eSIM profiles for wireless service in one or more geographical locations of the list during the predetermined period;

after the predetermined period has elapsed: detect the home wireless network, remove the set of the eSIM profiles from the one or more eSIM chips, and record a removal date of removing the set of the eSIM profiles; and wirelessly report the download date and the removal date to the service provider via the home wireless network.

2. The mobile subscriber apparatus of claim 1, wherein the set of the eSIM profiles only enables data transfer as the wireless service.

3. The mobile subscriber apparatus of claim 1, wherein data transmitted between the home wireless network and the mobile subscriber apparatus is encrypted.

4. The mobile subscriber apparatus of claim 1, wherein a data transfer speed and a signal strength of the home wireless network is maintained at a predetermined data transfer speed and a predetermined signal strength.

5. The mobile subscriber apparatus of claim 1, wherein the home wireless network comprises a wireless access point in a home or a workplace of a user of the mobile subscriber apparatus.

6. The mobile subscriber apparatus of claim 1, wherein the home wireless network comprises a cellular radio system accessed with a subscriber identity module installed in the mobile subscriber apparatus.

7. The mobile subscriber apparatus of claim 1, wherein the home wireless network comprises a public wireless network accessible in a permanent residence of a user of the mobile subscriber apparatus.

8. The mobile subscriber apparatus of claim 1, wherein a user interface is communicatively coupled with the at least one processor and/or circuit, and the at least one processor and/or circuit is configured to:
obtain the list and/or the predetermined period from a user of the mobile subscriber apparatus with the user interface.

9. The mobile subscriber apparatus of claim 1, wherein the at least one processor and/or circuit is configured to:
execute an electronic calendar application of a user of the mobile subscriber apparatus, and
obtain the list and/or the predetermined period from the electronic calendar application.

10. The mobile subscriber apparatus of claim 1, wherein the at least one processor and/or circuit is configured to:
execute an electronic mail application of a user of the mobile subscriber apparatus, and
obtain the list and/or the predetermined period from the electronic mail application.

11. The mobile subscriber apparatus of claim 1, wherein the at least one processor and/or circuit is configured to:
execute an electronic travel booking application of a user of the mobile subscriber apparatus, and
obtain the list and/or the predetermined period from the electronic travel booking application.

12. The mobile subscriber apparatus of claim 1, wherein the at least one processor and/or circuit is configured to:
receive a charge for the use of the set of the eSIM profiles while downloading the set of the eSIM profiles.

13. The mobile subscriber apparatus of claim 1, wherein the set of the eSIM profiles comprises prepaid eSIM profiles owned by the service provider, and the at least one processor and/or circuit is configured to:
receive a right to use the set of the prepaid eSIM profiles while; (a) downloading the set of the eSIM profiles for the predetermined period, or (b) between a time period of the downloading of the set of the eSIM profiles and the removing of the set of the eSIM profiles.

14. A non-transitory computer-readable medium storing computer program code that is executable by one or more processors and/or circuits of a mobile subscriber apparatus for use with a home wireless network that is secure and reliable, the computer program code causing the one or more processors and/or circuits to perform steps comprising:

compiling a list of geographical locations for a predetermined period that is set in future, and communicating wirelessly the list and the predetermined period to a service provider before the predetermined period;

detecting the home wireless network;

wirelessly downloading a set of embedded subscriber identity module (eSIM) profiles into one or more eSIM chips of the mobile subscriber apparatus from the service provider before the predetermined period begins, recording a download date of downloading the set of the eSIM profiles;

using the set of the eSIM profiles for wireless service in one or more geographical locations of the list during the predetermined period;

after the predetermined period has elapsed: detecting the home wireless network, removing the set of the eSIM profiles from the one or more eSIM chips, and recording a removal date of removing the set of the eSIM profiles; and; and wirelessly reporting the download date and the removal date to the service provider via the home wireless network.

15. A method for use with a home wireless network that is secure and reliable, the method comprising:

compiling a list of geographical locations for a predetermined period that is set in future, and communicating wirelessly the list and the predetermined period to a service provider before the predetermined period;

detecting the home wireless network;

wirelessly downloading a set of embedded subscriber identity module (eSIM) profiles into one or more eSIM chips of the mobile subscriber apparatus from the service provider before the predetermined period begins, recording a download date of downloading the set of the eSIM profiles;

using the set of the eSIM profiles for wireless service in one or more geographical locations of the list during the predetermined period;

after the predetermined period has elapsed: detecting the home wireless network, removing the set of the eSIM profiles from the one or more eSIM chips, and recording a removal date of removing the set of the eSIM profiles; and; and wirelessly reporting the download date and the removal date to the service provider via the home wireless network.

\* \* \* \* \*